Feb. 6, 1973   D. P. BENNETT, JR   3,714,783
PROPULSION METHOD IN AN INVERSE HYBRID ROCKET MOTOR
Filed Nov. 9, 1970   3 Sheets-Sheet 1

INVENTOR.
DONALD PERRY BENNETT, JR.
BY Martin E. Gerry
AGENT

INVENTOR.
DONALD PERRY BENNETT, JR.
BY Martin E. Gerry
AGENT

INVENTOR.
DONALD PERRY BENNETT, JR.
BY Martin E. Gerry
AGENT

United States Patent Office 3,714,783
Patented Feb. 6, 1973

3,714,783
PROPULSION METHOD IN AN INVERSE
HYBRID ROCKET MOTOR
Donald Perry Bennet, Jr., Arapahoe, Colo., assignor of a fractional part interest to Martin E. Gerry, Orange County, Calif.
Continuation-in-part of application Ser. No. 787,789, Dec. 30, 1968. This application Nov. 9, 1970, Ser. No. 87,958
Int. Cl. C06d 5/10
U.S. Cl. 60—207                              9 Claims

ABSTRACT OF THE DISCLOSURE

An inverse hybrid rocket motor where a fluid fuel reacts hypergolically in a combustion chamber with a nonfluid oxidizer to produce energy in the form of high temperature gases as reaction products, and means through which the reaction products are ejected to provide power to the rocket. Several unique oxidizers of the permanganate group and chromium trioxide are included. Fuels including hydrazenes and their derivatives, the carbonyl group, the ether group and such fuels as gasoline, diesel fuel and other petroleums and paraffin hydrocarbon derivatives are usable with these oxidizers to produce power.

COPENDING RELATED APPLICATIONS

This application is a continuing application in the form of a continuation-in-part of copending United States application Ser. No. 787,789, filed Dec. 30, 1968, now Pat. 3,555,826, issued Jan. 19, 1971.

BACKGROUND OF THE INVENTION

This invention is in the field of hypergolic rocket motors wherein nonfluid oxidizers are used in combination with fluid fuels rendering possible an inverse hybrid rocket motor.

Inverse hybrid rockets wherein a fluid fuel and a nonfluid oxidizer, generally have the disadvantage of not being hypergolic. This means that the fuel does not react on contact with the oxidizer, resulting in the requirement for additional ignition aids such as igniters, high voltage power supplies and the like for powering the igniters and in general require complex ignition systems which serve to lower the reliability of fuel combustion and in addition increases the costs of the rocket.

Other disadvantages in hybrid rockets include the use of highly refined and purified fuel and oxidizer components which are expensive to produce, are generally unstable when individually considered, and require exceptionally clean distribution systems to not only insure proper fuel ignition, but to prevent explosion of the fuel within the fuel containing chamber or in the fuel distribution system prior to injection into the combustion chamber. These disadvantages make necessary special handling and storing equipment and procedures, and create logistic problems in their use.

Another disadvantage of hybrid rockets is generally in their inability to be utilized as a power source for propelling a vehicle including aircraft, inability to be used for driving a turbo generator, and incapability of utilization as a flame-out prevention device in an air breathing jet aircraft and as a fuel conditioner therefor.

SUMMARY OF THE INVENTION

An objective of this invention is to provide an inverse hybrid rocket wherein a fluid fuel and a nonfluid oxidizer are hypergolic upon contact of the fuel with the oxidizer so as to obviate the need for auxiliary ignition systems, to increase the reliability of fuel ignition and hence rocket operation, and to decrease the costs of manufacture, cost of maintenance, and cost of operations utilizing this type of rocket.

Another objective relates to the purity of the chemical compounds comprising the fuel and oxidizer components. A purpose of this invention is therefore to utilize such oxidizers and fuels which will develop high energy and thrust and at the same time make possible the use of commercially available compounds rather than chemically pure compounds or elements.

Therefore, it is also an objective of this invention to avoid the use of chemically pure compounds or elements and use commercial grades of compounds or elements as the oxidizer and certain fuel components thereby avoiding the requirement for exceptionally clean interconnecting means and exceptionally clean fuel containers, since chemically pure fuel components and oxidizers will become contaminated by mere contact with the surfaces of the interconnecting means and the walls of the containers. Avoiding chemically pure fuel and oxidizer components increases the reliability of the rockets by assuring reaction between the fuel and oxidizer components at all times by proper choice of such components.

Further objectives of the invention are the use of such fuels and oxidizers which will not explode due to contact with the material of the containers because of the impurities in the container material that may be reactive with the fuels or oxidizers, to provide such fuel and oxidizer components which enable storing, handling, loading and utilizing the fuel and oxidizer components safely and as dictated by the logistics of operations in which the hybrid rocket is utilized.

Still further objectives of the invention are to adapt the hybrid rocket to be utilized as a power source for propelling a vehicle, as a power source for driving a turbo generator for creating electrical power, and for utilization of the combustion chamber containing the oxidizer of the hybrid rocket as part of a fuel injection system of an air breathing jet engine for providing pyrophoric ignition of any unburned fuel contained in the jet engine assuring jet fuel ignition and avoiding jet engine flame-out.

Briefly, in accordance with the invention, in addition to providing commercially available nonfluid oxidizer components and a group of fuel components for hypergolic reaction with oxidizer components, thereby making possible a reliable and relatively inexpensive rocket motor. The application of the principles of the rocket motor and uses of the rocket motor in other applications makes possible an energy or power source for preventing flame-out in a jet engine and for providing a fuel preconditioner as well as a source of auxiliary or direct power for driving any vehicle including aircraft, and for driving a turbo generator for generating electrical power, as well as rocket propulsive power.

Nonfluid oxidizers such as compounds of the permanganate group or chromium trioxide are effective for hypergolic reaction with the fluid fuels.

Fluid fuel components usable may bet selected from the classes of fuels consisting essentially of any combination of hydrazene or its derivatives; the ether family and its derivatives; the ketone family and its derivatives; the aldehyde family and its derivatives; and at least one fuel selected from the group of families of fuels and their derivatives consisting of diesel fuel, paraffine, alcohol, gasoline, jet petroleum, rocket petroleum, napalm and a ketone compound; or any mixture of any of the above named fuels.

Hence, means for generating a prime source of energy is provided, comprising a combustion chamber and a reaction product ejection means. Also provided, is a nonfluid mass oxidizer component which is retained in the combustion chamber and selected from the aforementioned oxidizers or combinations thereof, and such oxidizers as stated hereinbelow. Additionally, and selected from the classes of fuels stated hereinbelow and aforementioned, or mixtures thereof is a fluid fuel component injected in the combustion chamber which combines with the non-fluid mass oxidizer component in a hypergolic reaction thereby producing high temperature gases as reaction products of the hypergolic reaction. The reaction products thus formed pass through the ejection means to produce power or thrust or propulsion of the vehicle which this rocket motor is installed in to provide the requisite thrust or propulsive power.

It is therefore obvious that one important application of this energy source, in addition to propelling a rocket and the like, could be as a means for driving the blades of a turbine due to the high energy exhaust products ejected from a nozzle or similar ejection means. Another important application being as a self-contained propulsion device wherein again the high energy exhaust products passing through the ejection means are used to drive a device which could be an auxiliary jet rocket for use in aircraft to assist in take off or to boost speed. Still other important usage includes the device as a restart rocket for jet engines upon flame-out using it in the injection system of the jet engine. Further usage in connection with a jet aircraft are for fuel conditioning and to prevent flame-out from occurring. Still further applications include any flight vehicle as a means for temporarily increasing the specific impulse of such vehicle, particularly aircraft and rockets.

EXEMPLARY EMBODIMENT

Figure 1:
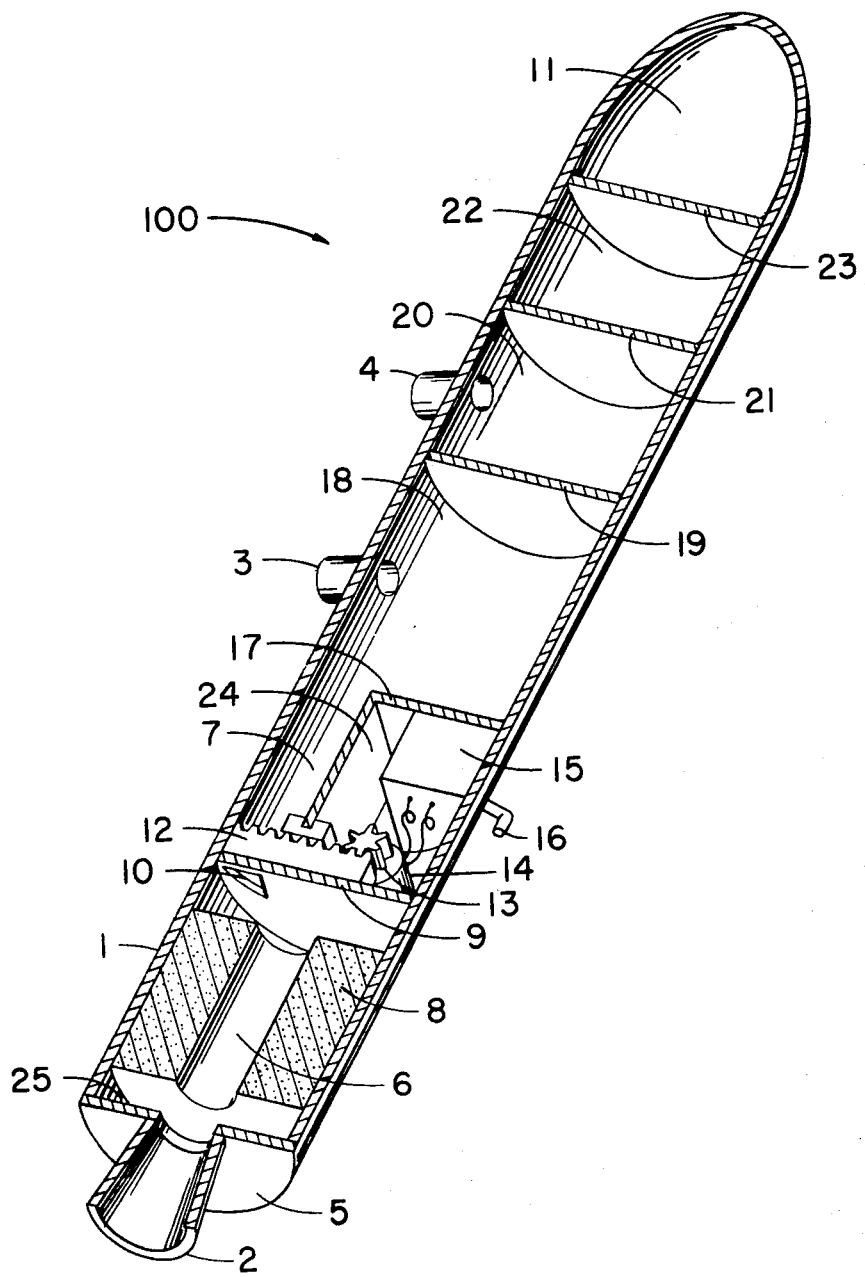
FIG. 1 is a perspective view, partially in cross-section of the inverse hybrid rocket or energy source, utilized as a propulsion vehicle in accordance with this invention.
Figure 2:
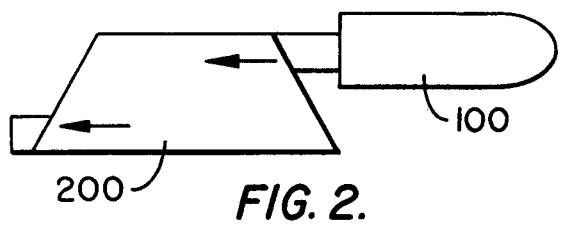
FIG. 2 is a plan view showing the energy source coupled to a turbine which includes an electrical power generator.
Figure 3:
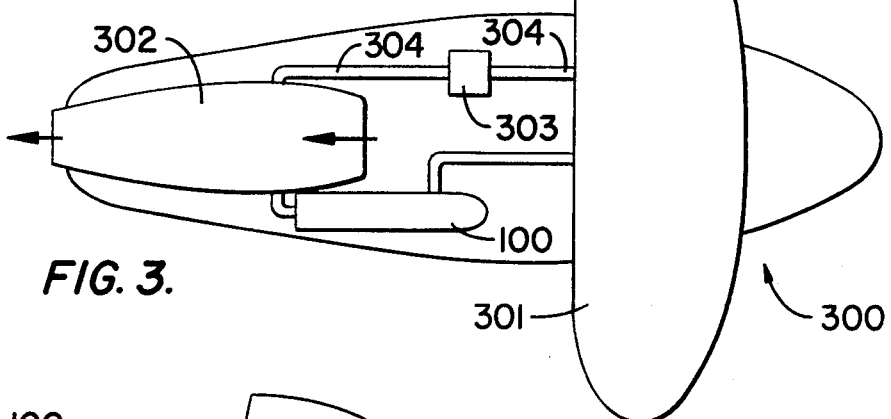
FIG. 3 is a plan view showing the energy source coupled to a jet engine for providing autoignition, flame-out proofing, and for acting as an auxiliary power means for the jet engine located in a jet aircraft.
Figure 4:
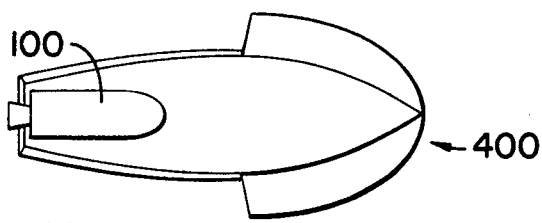
FIG. 4 is a plan view of a propulsion vehicle showing the energy source installed as a part thereof for propelling the vehicle.
Figure 5:
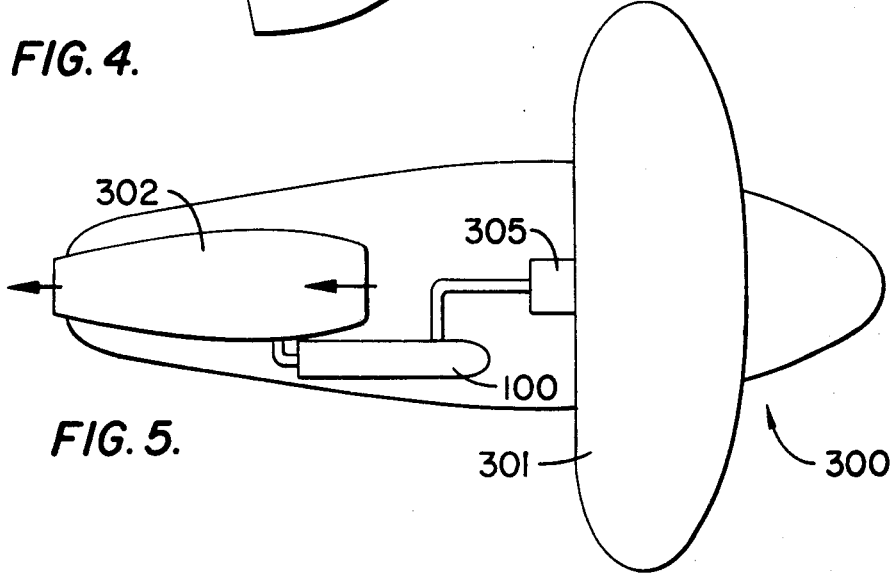
FIG. 5 is a plan view of a jet aircraft showing the energy source installed in the aircraft as part of the injector thereof for providing fuel conditioning for the jet engine.

Referring to FIGS. 1, 2, 3, 4 and 5, fuselage structure 1 has nozzle 2 mechanically attached to base 5, and base 5 has an aperture at its center through which the ignited fuel gases exhaust. Fuel loading port 3 is used for loading the fluid fuels by connecting a hose from an external fuel storage tank thereto. On completion of loading, fuel port 3 is mechanically sealed. The fuel is retained in fuel reservoir 18 and in fuel entry chamber 7. Port 4 is used for loading a compressed gas into a gas pressurizing chamber 20 by connecting a hose from an external pressure vessel thereto, and port 4 is thereafter sealed. Solid oxidizer 8, has a cylindrical aperture 6 along the length of its axis for providing a path for the fluid fuel to flow through and facilitate thorough hypergolic action, is located in oxidizer compartment 25 of structure 1. Valve seat 9 has an aperture 10 which aperture is normally blocked by valve gate control rack 12. Teeth of pinion 13 always cooperate with and engage teeth of rack 12, and pinion 13 is attached to shaft of valve control motor 14 for controlling the quantity of fuel flowing through aperture 10 by means of automatic valve control mechanism 15 to which the valve control motor 14 is electrically connected. The automatic valve control mechanism 15 is located in control compartment 24, which compartment is enclosed by means of enclosure 17, control mechanism 15 being remotely controlled by means of radio command signals impressed upon remote control antenna 16 which is electrically connected to a communications link which is an integral part of the automatic valve control mechanism 15, and which communications link translates the received signals into commands, activating the automatic valve control mechanism 15, thereby controlling the fuel flow. Command signals may be optionally manually provided by means of a hard line electrical connection between automatic valve control mechanism 15 and a control means located in cabin 22, and manually operated by a human being in the case where the propulsion vehicle is a manned flight vehicle. The propulsion vehicle has payload chamber 11 in which particular payloads are retained, and fixed separator wall 23 between cabin 22 and payload chamber 11 is mechanically affixed to the wall of structure 1. Fixed separator wall 21 between gas pressurizing chamber 20 and cabin 22 is mechanically affixed to wall of structure 1. Movable separator piston disk 19 is located between fuel reservoir 18 and gas pressurizing chamber 20, the edges of disk 19 cooperating with the wall of structure 1, thereby causing disk 19 to be moved in a piston-like fashion when a pressure differential between fuel reservoir chamber 18 and gas pressurizing chamber 20, exists.

When a command signal is given to activate the automatic valve control mechanism 15, thereby applying power to valve control motor 14, which rotates pinion 13 counterclockwise, teeth of pinion 13 cooperating with teeth of rack 12 cause rack 12 to be translated to a given distance from its normally aperture 10 blocking position, thereby permitting fluid fuel to flow through aperture 10 due to pressure differential between compartments 18 and 20, causing piston 19 to be moved, and forcing fluid fuel through into aperture 6 of solid or non fluid oxidizer 8 to ignite the fluid fuel hypergolically, and to cause a chemical reaction to occur at high temperatures, and to cause energy to be expended, causing violent combustion and an exhaust plume through nozzle 2 to propel the vehicle by virtue of the power and thrust developed.

Instead of exhausting through the nozzle, the energy source at 100 which had been above described, may be used equally effectively as a power generator by piping the exhaust gases directly from the aperture at the center of base 5, into which the above mentioned nozzle is inserted and held to a turbine at 200 or to other power or prime moving means to drive the turbine or other prime moving means thereby generating electrical power.

The application of the energy source to jet fuel conditioning for use in conventional jet engines or similarly powered vehicles of all types effects two distinct improvements in the operation of these vehicles, namely, fuel performance and fuel consumption are markedly improved and the engine is rendered flame-out proof. Autoignition is spontaneous and automatic even during flame out conditions.

Pyrophoric ignition of any unburned fuel of the jet engine is therefore provided by the reaction products resulting from the combination of the jet engine fuel with the oxidizer of the energy source. The basic principle of fuel conditioning in jet aircraft 300 involves the use of the energy source which raises the temperature of the fuel passed through it to the point at which it produces pyrophoric ignition in the jet engine without the requisite of ignition devices such as electrical, pyrotechnic, hot wire or the like. The flow rate of the jet fuel is adjusted by means of flow rate control valve 305 to provide the proper temperature with the minimum consumption of fuel in the energy source oxidizer chamber. Tailoring the oxidizer grain geometry to provide the proper flow pattern may also be required in this application. It is anticipated that no more than ten percent of the fuel entering the chamber would be oxidized, but it should be emphasized that this consumption is not a loss because the heat energy produced is absorbed by the unburnt fuel and injected with it into the combustion chamber of the jet engine to do useful work. The nonfluid oxidizer is of course consumed during this application as a fuel conditioner, but the particular oxidizer component used, lends itself to storage and handling as long as simple precautions are respected. Oxidizer grains could be replaced in the chamber during refueling operations and different sized grain segments could be used to tailor the charge to the specific vehicle mission.

Another way of stating the application of jet fuel conditioning more simply, is that jet fuel is stored in the wing storage tank 301 of an aircraft as at 300, and is relatively safe although the fuel is flammable because it is stored at a temperature below its ignition temperature or flash point, and is relatively isolated from air. The jet fuel is then pumped to the jet engine 302. The jet engine is specially designed with the energy source of this invention as part of the fuel injector system. When the fuel enters the energy source, it reacts with the oxidizer. About ten percent of the above stated fuel component reacts hypergolically with the oxidizer within the oxidizer chamber of the energy source. This produces heat which is absorbed by the remaining ninety percent of the fuel component, elevating the temperature of the fuel component in combination with the oxidizer component, and hence the reaction products produced thereby are at a temperature which is well above the ignition temperature of the fuel or its flash point. At this time, the hot mixture of fuel and combustion products are injected into the combustion chamber of the jet engine and therein mixed with air. Since the temperature of the mixture thus formed is already above the ignition point or flash point of the fuel, ignition takes place substantially instantaneously and automatically. This action is referred to as autoignition. Therefore, no auxiliary igniter such as spark plug, squib, hot wire, pyrotechnic device or the like is necessary for ignition of the fuels within the combustion chamber of the jet engine.

In event that flight conditions of the jet aircraft do not require continuous fuel conditioning to sustain the combustion conditions of the jet engine, fuel may be conducted directly to the jet engine fuel injector by means of a bypass valve 303 within bypass line 304. The energy source is then used to start the jet engine or to restart the engine in the event of failure of the fuel to combust within the jet engine so as to cause flame-out.

Continuous usage of the energy source in the jet engine makes possible flights of the jet aircraft at high speed and low altitudes without the necessity of complex adjustments to the jet aircraft engine so as to avoid flame-out. Conversely, the energy source is also applicable in a similar manner to jet aircraft for low speed and high altitude flights.

Application of the use of the inverse hybrid rocket motor to any type of transportation craft as at 400 is possible, and these craft may include missiles, water surface craft such as ships, underwater surface craft such as submarines, as well as spacecraft. Under conditions of usage, any combination of the aforesaid fuels and oxidizers, and those stated hereinbelow, chemical reactions occur hypergolically.

In the main, the importance and novelty of this invention is embodied in the use of a solid oxidizer which reacts hypergolically with fluid fuels to provide high energy and power, and in unique combinations of oxidizers and fuels, stated herein.

Figure 6:
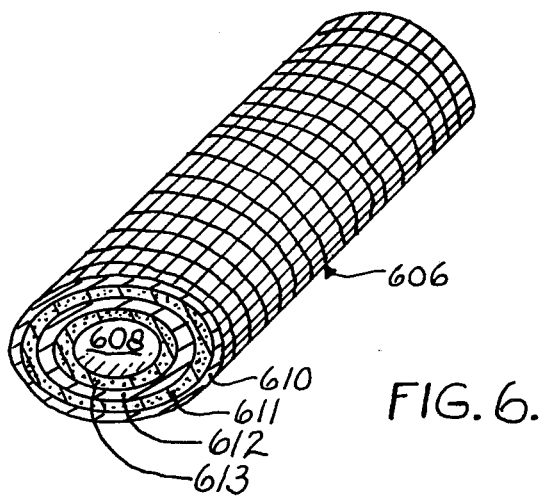
FIG. 6 is a perspective view of an alternate exemplary embodiment of a solid oxidizer which had been made by deposition of oxidizer material on two cylindrical stainless steel wire forms or plastic forms, where one cylinder is inserted in the other cylinder to be used in lieu of the oxidizer configuration shown in FIG. 1.
Figure 7:
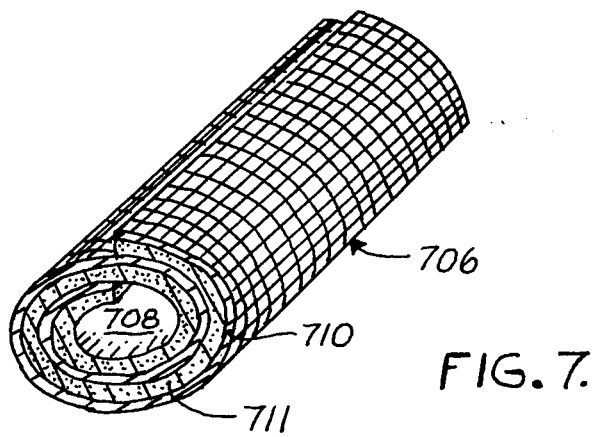
FIG. 7 is a perspective view of an alternate embodiment to the oxidizer structure of FIG. 6, wherein the oxidizer had been deposited on a long stainless steel screen or plastic screen and then rolled to form the convolute configuration shown with an aperture at its center and can also be used in lieu of the oxidizer configuration shown in FIG. 1.

Reference is made to FIGS. 6 and 7 representing oxidizer configurations alternate to oxidizer configuration 8 shown in FIG. 1.

In FIG. 6, the configuration is shown at 606. Configuration 606 comprises stainless steel or plastic fiber net 610 made into a cylinder of large diameter, on the inside surface of which is deposited the solid oxidizer by allowing it to solidify during the process of manufacture forming oxidizer material coating 611 thereon. A cylinder of smaller diameter having screen material 612 of the same type as screen material 610, is similarly formed with oxidizer coating 613 deposited on its inner surface. When the oxidizer coatings have solidified, the smaller cylinder is inserted into the larger cylinder thereby forming configuration 606. This configuration would have the same oxidizer compound as oxidizer compound 8 of FIG. 1. Hence, when used instead of cylinder oxidizer 8 of FIG. 1, fuel being injected into the combustion chamber will flow through aperture 608 and also between the two cylinders through crevices normally resulting due to unevenness of deposition of oxidizer compound normally resulting in its position. The presence of a screen will of course create greater structural strength in the oxidizer component to withstand the shocks resulting from forces acting upon vehicle 100 while in travel.

In FIG. 7, another alternate configuration to that of FIG. 6, shows the oxidizer component at 706. Steel screen or suitable plastic net 710 is used on which to deposit the oxidizer chemical 711. This is done generally when the screen is flat, and when the oxidizer is still in semi-solid form, the screen is rolled to form a convolute configuration, and the oxidizer is permitted to solidify. The resulting configuration also has an aperture 708 at its center through which the fuels are passed and same is installed in the combustion chamber of vehicle 100 to perform the same function therein as oxidizer 8 of FIG. 1, only to have added strength which is provided by screen 710. The oxidizer material in this configuration is the same as used in oxidizer 8 of FIG. 1 configuration.

Examples of the nonfluid oxidizer components used are selected from the class consisting of but not limited to any compound of the permanganate group such as potassium permanganate and sodium permanganate, chromium trioxide, or mixtures thereof.

Examples of the fluid fuel components which will react hypergolically with any combination of the aforestated nonfluid oxidizers may be selected from the group of at least two compounds consisting essentially of diesel fuel, paraffin, alcohol, gasoline, jet petroleum, rocket petroleum, napalm, and any of the ketones specified hereinbelow. Such fuels as diesel fuels, gasoline, jet or rocket petroleum can be classified as paraffine derivatives, and one type of napalm generally comprises gasoline, styrene and phosphorous initiator as part of this fuel, and another type of napalm comprises generally gasoline and paraffin. The use of two of the aforementioned fuels together as the fuel component gives rise to what is known as a synergistic effect.

Water additive to such and other fuels hereinbelow exemplified also gives rise to the synergistic effect thereby improving effectiveness of combustion upon contact with the oxidizer component hereinabove stated.

Alternatively, in conjunction with the aforestated oxidizers, one of the ketones may be used in combination with at least one fuel compound selected from the group consisting of diesel fuel, paraffin, alcohol, gasoline, jet petroleum, rocket petroleum and napalm, the ketone providing the synergistic effect on these fuel compounds.

Also, the aforesaid oxidizers may be used in combination with fuels comprising at least one compound selected from the group consisting of alcohol, and a ketone compound of the formulation hereinbelow given, and used in combination with at least one fuel compound selected from the group consisting of diesel fuel, paraffin, gasoline, jet petroleum, rocket petroleum and napalm, alcohol or the ketone providing the synergistic effect when combined with any of the other fuels.

In addition to the aforesaid fuels, the fluid fuel component is at least one constituent selected from the following classes of fuels consisting essentially of the examples and families of compounds hereinbelow stated:

Specific examples of aldehydes, usable as fuels, include but are not limited to formaldehyde, acetaldehyde, propionaldehyde, n-butyraldehyde, isobutraldehyde, n-valeraldehyde, n-caproaldehyde, n-heptaldehyde, crotonaldehyde, bromobutyraldehyde and chloral. Aldehydes include hydrocarbon derivatives thereof and are generally of the formulation RCHO where R constitutes hydrocarbon or substituted hydrocarbon radicals.

Specific examples of ketones, usable as fuels, include but are not limited to acetone, methyl ethyl ketone, methyl n-propyl ketone, methyl isopropyl ketone, diethyl ketone, hexanones, chloroacetone, bromoacetone, acetylacetone, acetonylacetone, mesityl oxide, phorone, benzophenone and dicyclopentyl ketone. Ketones are generally of mono or di-substituted hydrocarbon derivatives of the ketones having the formulation $R_1COR_2$ where $R_1$ and $R_2$ are each hydrocarbon or substituted hydrocarbon radicals.

Specific examples of ether compounds, usable as fuels, include but are not limited to methyl ether, ethyl ether, n-propyl ether, isopropyl ether, n-butyl ether, n-amyl ether, methyl ethyl ether, methyl n-propyl ether, methyl-isopropyl ether, methyl n-butyl ether, ethyl n-propyl ether, ethyl isopropyl ether, vinyl ether, vinyl ethyl ether, methyl allyl ether, ethyl allyl ether, allyl ether, cyclic ethers such as the epoxites, furanes, pyranes and difunctional cyclic ethers such as dioxanes, and ethers of the epoxy form such as methyl furanes and ethyl pyranes. Such ether compounds generally of mono or disubstituted hydrocarbon derivatives of the ethers have the formulation $R_1OR_2$ where $R_1$ and $R_2$ each constitute hydrocarbon or substituted hydrocarbon radicals.

Specific examples of alcohols usable as fuels include but are not limited to methyl alcohol; ethyl alcohol; n-propyl alcohol; isopropyl alcohol; n-butyl alcohol; tertiary-butyl alcohol; isobutyl alcohol; n-amyl alcohol; n-hexyl alcohol; n-heptyl alcohol; n-octyl alcohol; n-nonyl alcohol; n-decyl alcohol; dodecyl alcohol or lauryl; tetradecyl alcohol; hexadecyl alcohol or cetyl; octadecyl alcohol; allyl alcohol; 2,3-dibromopropanol-1; and 2,3-dichloropropynol-1. Such alcohol compounds have the formulation ROH where R constitutes hydrocarbon or substituted hydrocarbon groups.

Examples of hydrazines and hydrazine derivative compounds and mixtures of such compounds include but are not limited to the compounds stated hereinbelow. Such compounds may be alkyl hydrocarbons, aryl hydrocarbons, and heterocyclic ring systems such as furyl hydrazine or pyrrolyl hydrazine. Such compounds may be tolyl hydrazines such as 2-tolyl, 3-tolyl and 4-tolyl hydrazines; di-tolyl hydrazines such as 1(3-tolyl) - 2(4-tolyl) hydrazine; aryl hydrazines such as phenyl, diphenyl, triphenyl and tetraphenyl hydrazines; halogenated aryl hydrazines such as 2,4,6 - tribromo-phenyl, 2,4,6-trichlorophenyl, 2 - bromophenyl, 4 - bromophenyl and 2,4 - dichlorophenyl hydrazines; nitro-aryl hydrazenes such as 2 - nitrophenyl, 3 - nitrophenyl, and 4-nitrophenyl hydrazines; 1-acetyl - 2-phenyl hydrazine; benzyl hydrazine; 1-benzyl - 2(4-tolyl) hydrazine; 1,2 - diphenyl hydrazine; aminophenyl hydrazine; 1,2 - bis(4-aminophenyl) hydrazine; 1,2 - bis(1 - cyanocyclohexyl) hydrazine; 1,2 - dibenzoyl hydrazine; 1,2 - dibenzoyl - 1,2-dimethyl hydrazine; 1,2 - dibenzyl hydrazine; aliphatic hydrazines such as 1-2-diallyl, and 1,2-diethyl hydrazine; 1,2 - diformyl hydrazine; 1,2 - diisobutyl hydrazine; 1,2 - di(2 - naphthyl) hydrazine; 1 - methyl - 2 isopropyl hydrazine; 1-methyl - 2 phenyl hydrazine; 1-methyl - 2(3-tolyl) hydrazine; aromatic fused ring systems such as the naphthyl hydrazenes; 1,1-diethyl hydrazine; 1,1-dimethyl hydrazine; 1,1-di(4-tolyl) hydrazine; ethyl hydrazine; methyl hydrazine; isopropyl hydrazine; 1-methyl - 1-phenyl hydrazine; and cycloaliphatic hydrazines such as cycloparaffin derivatives. Such of these hydrazine constituents may be used in various combinations to form the fluid fuel component. Briefly stated, the fluid fuel component may consist of hydrazene or any of the mono, di, tri or tetrasubstituted hydrazine derivative compounds having the formulation

$$R_1R_2NNR_3R_4$$

where $R_1$, $R_2$, $R_3$ and $R_4$ are each hydrogen, hydrocarbon radicals, substituted hydrocarbon radicals, heterocyclic ring systems or mixtures thereof, where these hydrocarbon radicals, substituted hydrocarbon radicals and heterocyclic ring systems are selected to give the various hydrazines above stated as well as such other hydrazenes as obey the formulation of hydrazine derivative compounds herein defined.

All of the aforesaid fuels used either singly or in combination with other of such fuels may have water added thereto to assist in the reaction by virtue of the synergistic effect hereinabove stated.

It is also noted that fuel chambers and all such portions of the vehicle to be hereinbelow described which come in contact with the fuel should preferably be of stainless steel or such other material that is non reactive with the fuels used herein. The hydrazine family of fuels particularly cannot withstand oxide formation in its container, such as iron oxides, and therefore such problems are avoided by the use of stainless steel for those portions of the vehicle that come in contact with the hydrazine. Other materials such as plastic liners not reactive with hydrazine, or ceramics will function adequately in this application if the walls of the fuel container and walls of such other portions of the vehicle that come in contact with the fuel are lined with such materials. Because of this reaction with oxides, hydrazine makes an excellent fuel, producing exceptionally high specific impulses when reacting with the oxidizer components, above stated. Whether a ceramic, plastic which is non reactive with the fuels are used or liners of like effectiveness, or a stainless steel is used in such critical portions of the vehicle or in the entire vehicle, the advantages gained in terms of specific impulse, ease of usage and storage, power, and other characteristics far outweight any additional cost of such liners or of the use of stainless steel.

One example of a typical rocket motor and vehicle it propels is wherein the outer diameter of the vehicle and rocket motor is 10.25 inches, and the diameter of the oxidizer component therein is 10 inches, for an overall length of about 180 inches. For this configuration, the overall length of the oxidizer component is 45 inches and has a diameter aperture at its axial center of about 3 inches. Typical hydrazine fuel rates such as when unsymmetrical dimethyl hydrazine is used may be consumed from about 1.3 pounds per minute to about 13 pounds per minute depending upon the velocities desired. This type of hydrazine has a specific gravity or density of 0.7914. For the corresponding fuel rates consumed as given above, flight velocities between Mach 2 and Mach 4 can be expected. Higher velocities are possible with faster injection of fuels and larger vehicles to provide the room required for the increased oxidizer mass and fuel retention tanks. However, for the vehicle given, an approximate overall weight of 633 pounds can be expected. All the aforesaid fuels and oxidizers are at 70 degrees Farenheit temperature in preflight condition. However, temperatures substantially higher such as 150 degrees and subzero temperatures under which these fuels and oxidizers are exposed, such as either a desert or arctic atmosphere will not impair the operation of the vehicle nor impair hypergolic reaction. The only reason 70 degrees is stated is that it is indicative that these fuels are storable in most climatic conditions without necessity of heating or cooling. Further, for the typical velocities stated above, the vehicle will develop a thrust range between 60 and 300 pounds respectively. Under such fuel and oxidizer conditions an estimated specific impulse of 300 seconds may be achieved. The preignition weight of the oxidizer configuration above described is approximately 40 pounds. Also for the specific vehicle configuration of steel, it is expected that a minimum of 6.2 pounds of fuel would be required.

The substances of the oxidizer group above stated are each high energy containing substances and therefore during a combination with any of the aforesaid fuel components are combinable to produce a hypergolic reaction.

Upon reaction of a fuel component, such as aforesaid, with any of the oxidizers stated, the reaction products created by their reaction, include high temperature gases which result therefrom, and when passed out of the ejection means results in thrust or power such as propulsive power by virtue of the high energy resulting in the combustion chamber due to such hypergolic reaction of the named fuels with the named oxidizers.

All of the aforesaid specific examples of the hydrazenes, ethers, ketones and aldehydes provide sufficient examples of these fuels that satisfy the specific formulations hereinabove defined for each of these classes of fuels.

What is claimed is:

1. A method for producing propulsion in a means having a reaction product ejection means and having a combustion chamber for retaining a nonfluid oxidizer component therein, comprising the steps of:
    injecting a fluid fuel component in said combustion chamber for combining with said oxidizer component in a hypergolic reaction thereby producing high temperature gases as reaction products of said hypergolic reaction, said nonfluid oxidizer component being chromium trioxide, and said fluid fuel component being at least one constituent selected from the class consisting essentially of:
        any of the hydrazine compounds having the formulation $R_1R_2NNR_3R_4$ where $R_1$, $R_2$, $R_3$ and $R_4$ each constitute hydrogen, hydrocarbon radicals, substituted hydrocarbon radicals or heterocyclic ring systems;
        any of the ether compounds having the formulation $R_1ORR_2$ where $R_1$ and $R_2$ each constitute hydrocarbon or substituted hydrocarbon radicals;
        any of the aldehyde compounds having the formulation RCHO where R constitutes hydrocarbon or substituted hydrocarbon radicals;
        any of the ketones compounds having the formulation $R_1COR_2$ where $R_1$ and $R_2$ each constitute hydrocarbon or substituted hydrocarbon radicals; or
        a combination of fuels comprising:
            at least one fuel selected from the group consisting of an alcohol compound having the formulation ROH where R constitutes hydrocarbon or substituted hydrocarbon groups, and a ketone compound having the formulation $R_1COR_2$ where $R_1$ and $R_2$ each constitute hydrocarbon or substituted hydrocarbon groups; and
            at least one fuel selected from the group consisting of paraffin, diesel fuel, gasoline, jet petroleum, rocket petroleum and napalm; and
    passing said reaction products through said ejection means for providing said propulsion.

2. A method for producing propulsion in a means having a reaction product ejection means and having a combustion chamber for retaining a nonfluid oxidizer component therein, comprising the steps of:
    injecting a fluid fuel component in said combustion chamber for combining with said oxidizer component in a hypergolic reaction thereby producing high temperature gases as reaction products of said hypergolic reaction, said reaction products being passed through said ejection means for providing said propulsion, said nonfluid oxidizer component being chromium trioxide, and said fluid fuel component being at least one constituent selected from the class consisting of any of the hydrazine compounds having the formulation $R_1R_2NNR_3R_4$ where $R_1$, $R_2$, $R_3$ and $R_4$ each constitute hydrogen, hydrocarbon radicals, substituted hydrocarbon radicals or heterocyclic ring systems.

3. The invention as stated in claim 1, wherein:
    the fluid fuel component is limited to at least one constituent selected from the class consisting of:
        any of the ether compounds having the formulation $R_1OR_2$ where $R_1$ and $R_2$ each constitute hydrocarbon or substituted hydrocarbon radicals;
        any of the aldehyde compounds having the formulation RCHO where R constitutes hydrocarbon or substituted hydrocarbon radicals; and
        any of the ketone compounds having the formulation $R_1COR_2$ where $R_1$ and $R_2$ each constitute hydrocarbon or substituted hydrocarbon radicals.

4. The invention as stated in claim 1, wherein:
    the fluid fuel component is limited to the combination of fuels comprising:
        at least one fuel selected from the group consisting of an alcohol compound having the formulation ROH where R constitutes hydrocarbon or substituted hydrocarbon groups, and a ketone compound having the formulation $R_1COR_2$ where $R_1$ and $R_2$ each constitute hydrocarbon or substituted hydrocarbon groups; and
        at least one fuel selected from the group consisting of paraffin, diesel fuel, gasoline, jet petroleum, rocket petroleum and napalm.

5. The invention as stated in claim 2, including the further step of:
    injecting water additive to the fuel component.

6. The invention as stated in claim 3, including the further step of:
    injecting water additive to the fuel component.

7. The invention as stated in claim 4, including the further step of:
    injecting water additive to the fuel component.

8. The invention as stated in claim 2, including the further step of:
    injecting said reaction products into an air breathing fuel burning jet engine for pyrophoric ignition of any unburned fuel in said jet engine.

9. The invention as stated in claim 3, including the further step of:
    injecting said reaction products into an air breathing fuel burning jet engine for pyrophoric ignition of any unburned fuel in said jet engine.

References Cited

UNITED STATES PATENTS

| | | | |
|---|---|---|---|
| 3,101,589 | 8/1963 | Hamrick et al. | 60—220 |
| 3,503,212 | 3/1970 | Jennings et al. | 60—219 |
| 3,081,595 | 3/1963 | Rose | 60—218 X |
| 3,230,701 | 1/1966 | Mullen II et al. | 60—218 X |
| 3,165,382 | 1/1965 | Forte | 60—218 |
| 3,350,887 | 11/1967 | Leunig et al. | 60—220 |

BENJAMIN R. PADGETT, Primary Examiner

U.S. Cl. X.R.

60—209, 210, 218, 219. 220